United States Patent
Guo et al.

(10) Patent No.: US 11,760,892 B2
(45) Date of Patent: Sep. 19, 2023

(54) AQUEOUS PIGMENT DISPERSIONS

(71) Applicant: Hewlett-Packard Development Company, L.P., Spring, TX (US)

(72) Inventors: Dennis Z. Guo, San Diego, CA (US); Jie Zheng, San Diego, CA (US); Tienteh Chen, San Diego, CA (US); David Michael Ingle, San Diego, CA (US); Rodney David Stramel, San Diego, CA (US); June Yang, Aguadilla (TR); Marcos A. Barreto Caban, Aguadilla (TR)

(73) Assignee: Hewlett-Packard Development Company, L.P., Spring, TX (US)

( * ) Notice: Subject to any disclaimer, the term of this patent is extended or adjusted under 35 U.S.C. 154(b) by 613 days.

(21) Appl. No.: 16/765,599

(22) PCT Filed: Jan. 19, 2018

(86) PCT No.: PCT/US2018/014317
§ 371 (c)(1),
(2) Date: May 20, 2020

(87) PCT Pub. No.: WO2019/143341
PCT Pub. Date: Jul. 25, 2019

(65) Prior Publication Data
US 2020/0277506 A1 Sep. 3, 2020

(51) Int. Cl.
*C09D 11/322* (2014.01)
*C09B 47/04* (2006.01)
(Continued)

(52) U.S. Cl.
CPC ............ *C09D 11/322* (2013.01); *C09B 47/04* (2013.01); *C09D 11/033* (2013.01); *C09D 11/037* (2013.01); *C09D 11/107* (2013.01); *C09D 17/001* (2013.01); *C09D 17/003* (2013.01)

(58) Field of Classification Search
CPC ... C09D 11/322; C09D 11/326; C09D 11/037; C09D 17/003; C09D 11/106;
(Continued)

(56) References Cited

U.S. PATENT DOCUMENTS 5,726,259 A 3/1998 Hayes et al.
5,854,308 A 12/1998 Kuo et al.
(Continued)

FOREIGN PATENT DOCUMENTS

| EP | 1056814 | 11/2004 |
| EP | 2090624 | 8/2009 |
| WO | 2016092310 | 6/2016 |

OTHER PUBLICATIONS

Magdassi, The Chemistry of Inkjet Inks, World Scientific Publishing Co. Pte. Ltd., Singapore, 2010, 339 pages.
(Continued)

*Primary Examiner* — An H Do
(74) *Attorney, Agent, or Firm* — HP Inc. Patent Department

(57) ABSTRACT

The present disclosure is drawn to aqueous pigment dispersions. In one example, an aqueous pigment dispersion can include from 40 wt % to 90 wt % water, from 2 wt % to 30 wt % organic co-solvent, from 7.5 wt % to 30 wt % copper phthalocyanine pigment, from 0.5 wt % to 5 wt % styrene-acrylic dispersant, and from 0.5 wt % to 5 wt % hydrophilic polyurethane dispersant having a weight average molecular weight from 10,000 Mw to 30,000 Mw. The styrene-acrylic dispersant and the hydrophilic polyurethane dispersant can be present at a weight ratio from 1:10 to 2:1.

18 Claims, 1 Drawing Sheet

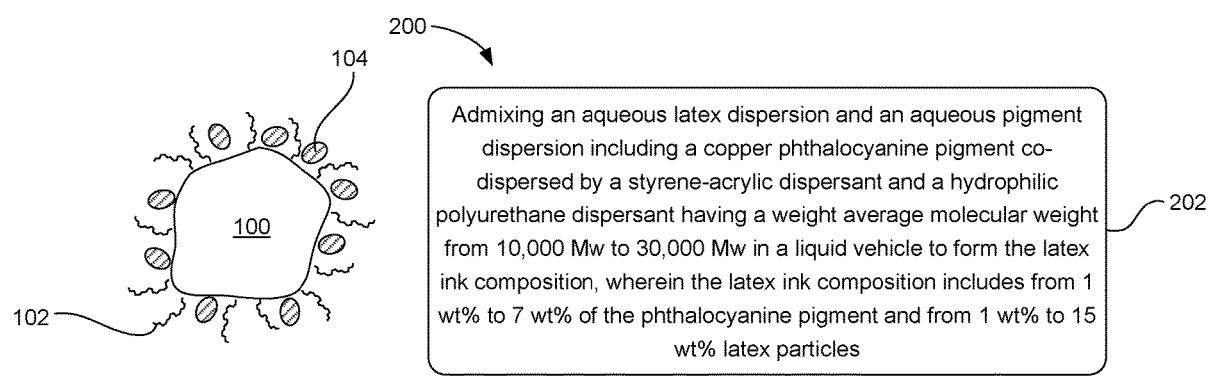

(51) Int. Cl.
*C09D 11/033* (2014.01)
*C09D 11/037* (2014.01)
*C09D 11/107* (2014.01)
*C09D 17/00* (2006.01)

(58) Field of Classification Search
CPC .. C09D 11/107; C09D 17/001; C09D 11/033; C09D 11/102; C09B 47/04
See application file for complete search history.

(56) References Cited

U.S. PATENT DOCUMENTS

| | | |
|---|---|---|
| 6,136,890 A | 10/2000 | Carlson et al. |
| 6,713,531 B2 | 3/2004 | Iijima |
| 8,246,156 B2 | 8/2012 | Hasegawa et al. |
| 9,085,707 B2 | 7/2015 | Chevli et al. |
| 9,139,676 B2 | 9/2015 | Yang et al. |
| 9,523,011 B2 | 12/2016 | Robello et al. |
| 9,828,514 B2 * | 11/2017 | Lussier ................ C09D 11/107 |
| 11,180,671 B2 * | 11/2021 | Inoue ................ C09D 11/326 |
| 2005/0228069 A1 | 10/2005 | Kataoka et al. |
| 2005/0255254 A1 | 11/2005 | Desie et al. |
| 2017/0292032 A1 | 10/2017 | Lussier et al. |

OTHER PUBLICATIONS

International Search Report dated Dec. 6, 2018 for PCT/US2018/014317, Applicant Hewlett-Packard Development Company, L.P.

\* cited by examiner

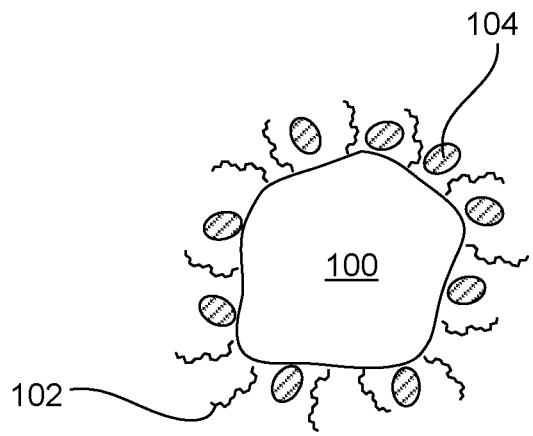

Admixing an aqueous latex dispersion and an aqueous pigment dispersion including a copper phthalocyanine pigment co-dispersed by a styrene-acrylic dispersant and a hydrophilic polyurethane dispersant having a weight average molecular weight from 10,000 Mw to 30,000 Mw in a liquid vehicle to form the latex ink composition, wherein the latex ink composition includes from 1 wt% to 7 wt% of the phthalocyanine pigment and from 1 wt% to 15 wt% latex particles — 202

FIG. 2

AQUEOUS PIGMENT DISPERSIONS

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase providing demand for new ink compositions.

Pigmented inks have become particularly popular in recent years due to several advantages over dye-based inks. However, printing pigments can sometimes be a challenge as each pigment has different chemistry and thus, behaves differently when printing using inkjet printing technology. For example, some pigments present challenges with respect to stability, decap performance, decel performance, image quality, or the like. Thus, the formulation of pigment dispersions and/or ink compositions that address some of these and/or other issues can be desirable.

BRIEF DESCRIPTION OF DRAWINGS

Additional features and advantages of the disclosure will be apparent from the detailed description which follows, taken in conjunction with the accompanying drawings, together illustrating, by way of example, features of the present technology. It should be understood that the figures are representative of examples of the present disclosure and should not be considered as limiting the scope of the disclosure.

FIG. 1 schematically represents an example pigment co-dispersed by two dispersants that are associated with the pigment in accordance with the present disclosure; and FIG. 2 depicts an example method of formulating a latex ink composition in accordance with the present disclosure.

DETAILED DESCRIPTION

Performance related printing challenges can exist with copper phthalocyanine pigmented ink compositions, and thus, the preparation of pigment dispersions and latex ink compositions that include copper phthalocyanine pigments that address some of these challenges can be desirable. For example, copper phthalocyanine pigments can sometimes interact with other ink components to produce problems with ink drop velocity deceleration, or "decel." Decel refers to a decrease in the velocity of ink droplets fired from an inkjet printer. In many cases, copper phthalocyanine pigmented inks can be subject to decel after the ink has aged for a period of several months. Additionally, formulating latex ink compositions with copper phthalocyanine pigments poses an additional challenge due to generally high concentrations of solids and other ingredients contained therein. Dispersion stability is one issue to consider with such inks, as an unstable dispersion can lead to jettability issues. Consequently, it can be difficult to formulate latex ink compositions, as well as pigment dispersions suitable for preparing latex ink compositions, with copper phthalocyanine pigments that can exhibit good stability and decel performance.

In accordance with this, the present disclosure relates generally to aqueous pigment dispersions, latex ink compositions, and methods of preparing latex ink compositions. In one example, an aqueous pigment dispersion can include from 40 wt % to 90 wt % water, from 2 wt % to 30 wt % organic co-solvent, from 7.5 wt % to 30 wt % copper phthalocyanine pigment, from 0.5 wt % to 5 wt % styrene-acrylic dispersant, and from 0.5 wt % to 5 wt % hydrophilic polyurethane dispersant having a weight average molecular weight from 10,000 Mw to 30,000 Mw. In one example, the styrene-acrylic dispersant and the hydrophilic polyurethane dispersant can be present at a weight ratio from 1:10 to 2:1. In further examples, the styrene-acrylic dispersant and the hydrophilic polyurethane dispersant can be present at a weight ratio from 1:10 to 1:1, 1:2 to 1:1, or 1:2 to 2:1. In another example, the hydrophilic polyurethane dispersant can have a weight average molecular weight from 12,000 Mw to 20,000 Mw.

In further examples, the hydrophilic polyurethane dispersant can be a copolymerization product of monomers including 10 wt % to 50 wt % of an aromatic diol, 10 wt % to 40 wt % of an acid-containing diol, and 25 wt % to 75 wt % of a non-aromatic diisocyanate. In another example, the monomers can include 15 wt % to 40 wt % of the aromatic diol, 15 wt % to 40 wt % of the acid-containing diol, and 25 wt % to 50 wt % of the non-aromatic diisocyanate.

In further examples, the aromatic diol copolymerized in the hydrophilic polyurethane dispersant can be:

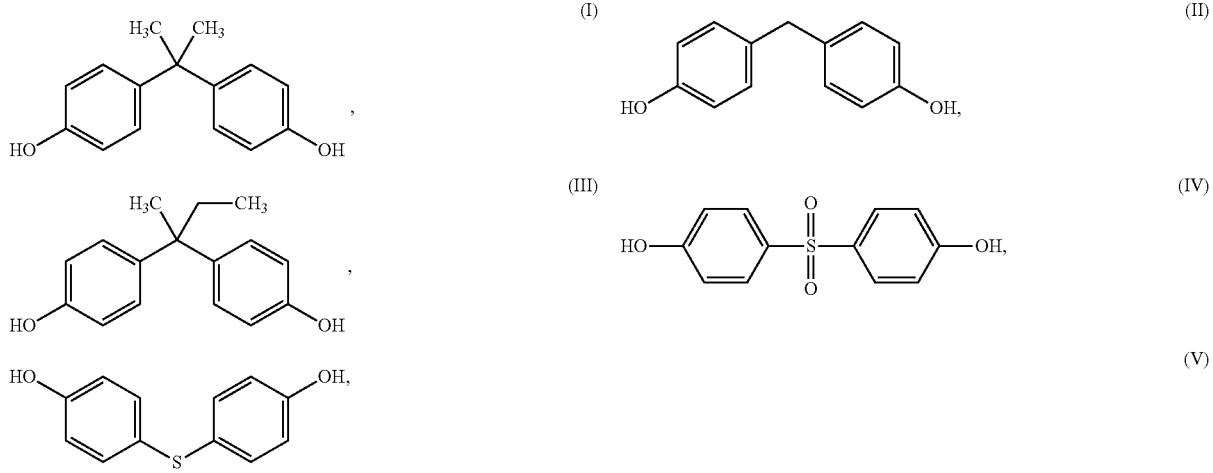

-continued

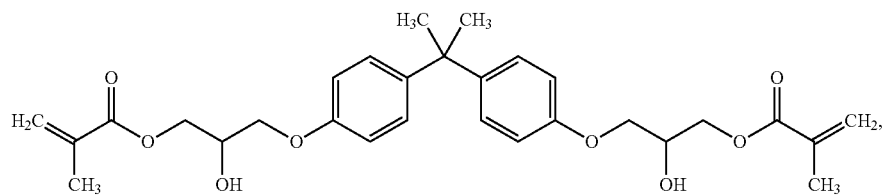
(VI)

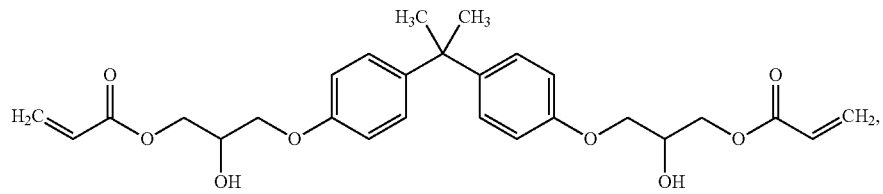
(VII)

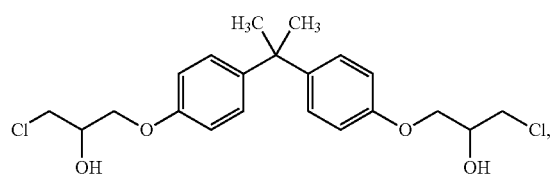
(VIII)

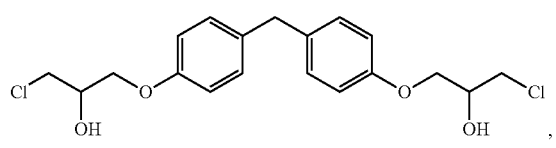
(IX)

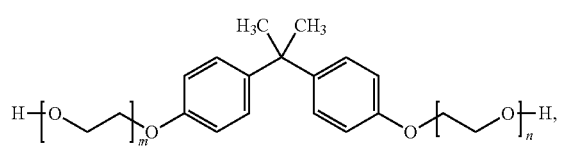
(X)

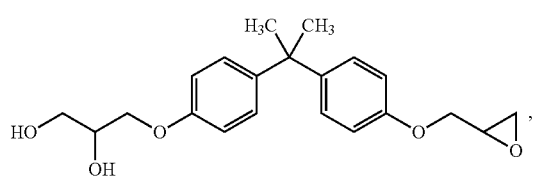
(XI)

or a combination thereof, wherein m and n can independently be integers from 1 to 10.

In another example, a latex ink composition can include an aqueous liquid vehicle, from 0.3 wt % to 7 wt % copper phthalocyanine pigment co-dispersed by a styrene-acrylic dispersant and a hydrophilic polyurethane dispersant having a weight average molecular weight from 10,000 Mw to 30,000 Mw, and from 1 wt % to 15 wt % latex particles. In a certain example, the styrene-acrylic dispersant and the hydrophilic polyurethane dispersant can be present at a weight ratio from 1:10 to 2:1.

In further examples, the hydrophilic polyurethane dispersant can be a copolymerization product of monomers including an aromatic diol, an acid-containing diol, and a non-aromatic diisocyanate. In a particular example, the monomers of the hydrophilic polyurethane dispersant can be copolymerized in amounts of 10 wt % to 50 wt % of the aromatic diol, 10 wt % to 40 wt % of the acid-containing diol, and 25 wt % to 75 wt % of the non-aromatic diisocyanate. In another example, the monomers can include 15 wt % to 40 wt % of the aromatic diol, 15 wt % to 40 wt % of the acid-containing diol, and 25 wt % to 50 wt % of the non-aromatic diisocyanate.

In further examples, the aromatic diol can be any of compounds (I) through (XI) mentioned above. In still further examples the non-aromatic diisocyanate can be:

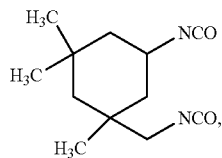
(XII)

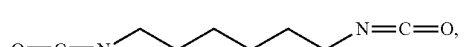
(XIII)

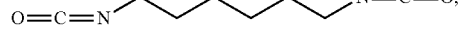
(XIV)

(XV)

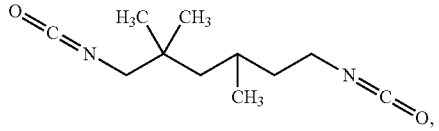

or a combination thereof.

In another example, the copper phthalocyanine pigment and the total dispersant content in the latex ink composition can be present at a weight ratio from 15:1 to 2:1. In yet another example, the styrene-acrylic dispersant can have a weight average molecular weight ranging from 4,000 Mw to 30,000 Mw and an acid number ranging from 100 mg/g to 350 mg/g, and the hydrophilic polyurethane dispersant can have an acid number from 40 mg/g to 100 mg/g. In a further example, the hydrophilic polyurethane dispersant can have an average particle size ranging from 0.1 nm to 30 nm.

In some examples, the latex particles can include a polymerization product of monomers including: a copolymerizable surfactant; an aromatic monomer selected from styrene, an aromatic (meth)acrylate monomer, and an aromatic (meth)acrylamide monomer; and multiple aliphatic (meth)acrylate monomers or multiple aliphatic (meth)acrylamide monomers. The term "(meth)" indicates that the acrylamide, the acrylate, etc., may or may not include the methyl group. In one example, the latex particles can include a polymerization product of a copolymerizable surfactant such as Hitenol™ BC-10, BC-30, KH-05, or KH-10. In another example, the latex particles can include a polymerization product of styrene, methyl methacrylate, butyl acrylate, and methacrylic acid. In another particular example, the latex particles can include a first heteropolymer phase and a second heteropolymer phase, wherein the first heteropolymer phase is a polymerization product of multiple aliphatic (meth)acrylate monomers or multiple aliphatic (meth)acrylamide monomers. The second heteropolymer phase can be a polymerization product of an aromatic monomer with a cycloaliphatic monomer, wherein the aromatic monomer is an aromatic (meth)acrylate monomer or an aromatic (meth)acrylamide monomer, and wherein the cycloaliphatic monomer is a cycloaliphatic (meth)acrylate monomer or a cycloaliphatic (meth)acrylamide monomer. The second heteropolymer phase can have a higher glass transition temperature than the first heteropolymer phase.

In another example, a method of formulating a latex ink composition can include admixing an aqueous latex dispersion and an aqueous pigment dispersion including a copper phthalocyanine pigment co-dispersed by a styrene-acrylic dispersant and a hydrophilic polyurethane dispersant having a weight average molecular weight from 10,000 Mw to 30,000 Mw in a liquid vehicle to form the latex ink composition. The latex ink composition can include from 0.3 wt % to 7 wt % of the copper phthalocyanine pigment and from 1 wt % to 15 wt % latex particles. In some examples, the hydrophilic polyurethane dispersant can be a copolymerization product of monomers including 10 wt % to 50 wt % of an aromatic diol, 10 wt % to 40 wt % of an acid-containing diol, and 25 wt % to 75 wt % of a non-aromatic diisocyanate. In further examples, the monomers can include 15 wt % to 40 wt % of the aromatic diol, 15 wt % to 40 wt % of the acid-containing diol, and 25 wt % to 50 wt % of the non-aromatic diisocyanate.

It is noted that when discussing the aqueous pigment dispersion, latex ink composition, and the method of formulating a latex ink composition, each of these discussions can be considered applicable to other examples whether or not they are explicitly discussed in the context of that example unless expressly indicated otherwise. Thus, for example, in discussing a styrene-acrylic dispersant related to a latex ink composition, such disclosure is also relevant to and directly supported in context of the aqueous pigment dispersion, the method of formulating the latex ink composition, and vice versa.

The aqueous pigment dispersions, latex ink compositions, and method of preparing latex ink compositions presented herein can incorporate copper phthalocyanine pigments. Derivatives of phthalocyanine can be utilized to create copper phthalocyanine pigments. Phthalocyanine is an organic molecule including the general formula $C_{32}H_{18}N_8$ having the following structure:

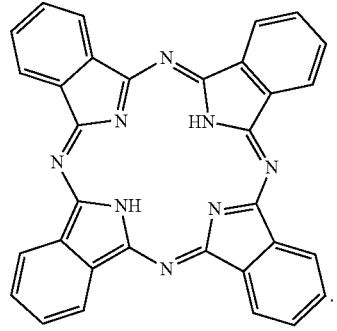

(XVI)

Copper phthalocyanine pigments can be metal complexes in which a copper atom associates with the central nitrogen atoms of the phthalocyanine structure, replacing the two hydrogen atoms of the central NH groups. For example, Pigment Blue 15 has the following structure:

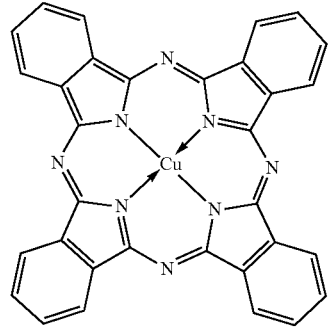

(XVII)

Thus, copper phthalocyanine pigments often do not actually include a phthalocyanine molecule itself, but rather are derived from phthalocyanine. In other examples, copper phthalocyanine pigments can include halogen atoms attached to the aromatic rings of the phthalocyanine structure, such as chlorine and brome in particular. In some examples, the copper phthalocyanine pigments used in the pigment dispersions and inks described herein can be a phthalocyanine blue pigment or a phthalocyanine green pigment. In specific examples, the copper phthalocyanine pigment can include PB 15:3, PB 15:4, PG 7, PG 36, or a combination thereof.

The copper phthalocyanine pigment can be present at varying concentrations in the aqueous pigment dispersion and/or the latex ink composition. For example, the copper phthalocyanine pigment can be present in an aqueous pigment dispersion (used to formulate the ink compositions) at from 7.5 wt % to 30 wt %. In yet other examples, the copper phthalocyanine pigment can be present in the aqueous pigment dispersion at from 10 wt % to 20 wt %, or from 12 wt % to 18 wt %. These weight percentages are intended to be independent of the two dispersants that are included in the aqueous pigment dispersion as a whole. On the other hand, the copper phthalocyanine pigment (dispersed by the two dispersants) can be present at from 0.3 wt % to 7 wt %, from 0.4 wt % to 6 wt %, or from 0.5 wt % to 5 wt % in the latex ink composition. Thus, when formulating the latex ink composition, the pigment in the pigment dispersion can become diluted with additional ingredients, such as additional water or other liquid vehicle compositions, latex, etc.

The weight ratio of copper phthalocyanine pigment to total dispersant content (e.g., both types of dispersant included) in the aqueous pigment dispersion or the latex ink composition can vary. For example the weight ratio can be from 15:1 to 2:1, from 10:1 to 2:1, from 5:1 to 3:1, etc. Thus, the copper phthalocyanine pigment can be co-dispersed by a styrene-acrylic dispersant and a hydrophilic polyurethane dispersant within these weight ratios, as an example.

By way of example, FIG. 1 schematically depicts a copper phthalocyanine pigment 100 that is co-dispersed by two dispersants, namely a styrene-acrylic dispersant 102 and a hydrophilic polyurethane 104 as shown in FIG. 1. In one example, the weight ratio of styrene-acrylic dispersant to hydrophilic polyurethane dispersant can be from 1:10 to 2:1, 1:10 to 1:1, from 1:2 to 2:1, or from 1:2 to 1:1. In some examples, the weight ratio can be about 2:1, about 1:1, or about 1:2.

Notably, the structure of the pigments and the dispersants is not intended to be to scale or to represent chemical structure, but rather to simply show that there are two different types of dispersants associated with a surface of the copper phthalocyanine pigment. Additionally, in accordance with the present disclosure, the dispersants are not covalently attached to the pigment surface, but rather electrostatically or otherwise associated with the pigment surface. The styrene-acrylic dispersant can associate with the pigment through π-stacking between the aromatic rings of the copper phthalocyanine pigment and of styrene, adsorption or other similar attractions. The hydrophilic polyurethane dispersant can associate with the pigment through adsorption, hydrogen bonding, or other similar attractions.

In one example, the styrene-acrylic dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene-acrylic dispersant can have an acid number from 100 to 350, from 120 to 350, from 150 to 300, from 180 to 250, or about 214, for example. Exemplary commercially available styrene-acrylic dispersants can include Joncryl® 671, Joncryl® 71, Joncryl® 96, Joncryl® 680, Joncryl® 683, Joncryl® 678, Joncryl® 690, Joncryl® 296, Joncryl® 671, Joncryl® 696 or Joncryl® ECO 675 (all available from BASF Corp., Germany).

The hydrophilic polyurethane can also be included to provide additional dispersion properties to the copper phthalocyanine pigment. In one example, the hydrophilic polyurethane can have a weight average molecular weight ranging from 10,000 Mw to 30,000 Mw, or from 12,000 Mw to 20,000 Mw. In one example, the hydrophilic polyurethane dispersant can have a weight average molecular weight of about 13,000 Mw to 16,000 Mw. In some examples, the hydrophilic polyurethane can have an acid number ranging from 40 to 100, from 40 to 85, from 40 to 75, or from 40 to 60. The particle size of the hydrophilic polyurethane dispersant can range from 0.1 nm to 30 nm, from 1 nm to 25 nm, from 10 nm to 30 nm, or from 2 nm to 8 nm.

In one example, the hydrophilic polyurethane dispersant can be a copolymerization product of a non-aromatic diisocyanate, an acid-containing diol, and an aromatic diol, for example. In further detail, the hydrophilic polyurethane dispersant can be a copolymerization product of 10 wt % to 50 wt % of an aromatic diol, 10 wt % to 40 wt % of an acid-containing diol, and 25 wt % to 75 wt % of a non-aromatic diisocyanate.

Exemplary non-aromatic diisocyanates that can be used can include structures (XII) through (XV) shown above, or a combination thereof. In one example, the non-aromatic diisocyanate can be isophorone diisocyanate (XII). In some examples, the non-aromatic diisocyanate can be present in the copolymerization reaction from 25 wt % to 75 wt %, from 25 wt % to 65 wt %, or from 25 wt % to 50 wt %. In one example, the non-aromatic diisocyanate can be an aliphatic or cycloaliphatic diisocyanate.

Exemplary acid-containing diol monomers that can be used in the copolymerization reaction can include dimethylolpropionic acid, dimethylol butanoic acid, dihydroxymaleic acid, tartaric acid, or combinations thereof. In one example, the acid-containing diol can be dimethylolpropionic acid. In some examples, the acid-containing diol can be present in the copolymerization reaction at from 10 wt % to 40 wt %, from 10 wt % to 30 wt %, or from 15 wt % to 25 wt %.

The aromatic diol can include two or more hydroxyl groups. Specific examples of the aromatic diol can include structures (I) through (XI) shown above. In one example the aromatic diol can be Bisphenol A ethoxylate (BPAE) (structure (X)). In some examples, the aromatic diol can be present in the copolymerization reaction at from 10 wt % to 50 wt %, from 15 wt % to 40 wt %, or from 20 wt % to 30 wt %. In other examples, the aromatic diol can have a weight average molecular weight from 200 Mw to 2,000 Mw, from 200 Mw to 1,000 Mw, or from about 250 Mw to about 600 Mw.

In further detail regarding the copolymerization of the hydrophilic polyurethane, the copolymerization reaction can further include a polyethyleneoxide compound. The polyethyleneoxide compound can include polyetheramines, methoxy polyethylene glycol, polyethyleneoxide diol, or combinations thereof. Commercially available examples can include YMER™ N-120 (Perstop Holding AB, Sweden), Jeffamine® M-700, Jeffamine® M-2070 (both available from Huntsman Corp., Massachusetts), and methoxy polyethylene glycol (Millipore Sigma, Missouri). In some examples, the polyethyleneoxide compound can be present at from 0 wt % to 5 wt %, from 0.9 wt % to 1.2 wt %, or from 0.1 wt % to 1 wt %. In one example, the polyethylene compound can have a water solubility of greater than 10 wt % and a hydroxyl functionality ranging from 1.8 to 3.

The aqueous pigment dispersion and the latex ink composition can further include organic co-solvent. With respect to the aqueous pigment dispersion, the organic co-solvent can be present at from 2 wt % to 30 wt %, from 5 wt % to 25 wt %, from 15 wt % to 30 wt %, or from 5 wt % to 10 wt %. When formulating latex ink composition, more organic co-solvent or less organic co-solvent may be used, e.g., by diluting the organic co-solvent content or by adding more organic co-solvent when formulating the latex ink composition. In one example, in the latex ink composition, the organic co-solvent can be present at from 5 wt % to 40 wt %, from 10 wt % to 35 wt %, from 15 wt % to 30 wt %, from 20 wt % to 30 wt %, or from 10 wt % to 30 wt %. Water can also be included in the aqueous pigment dispersion and in the latex ink composition. The amount of water in the aqueous pigment dispersion from 40 wt % to 90 wt %, from 50 wt % to 85 wt %, or from 60 wt % to 90 wt %. Again, when formulating latex ink composition, more or less water may be present compared to the aqueous pigment dispersion, e.g., by diluting the water content or by adding more water when formulating the latex ink composition. For example, the water content in the latex ink composition can be from 20 wt % to 98 wt%, from 30 wt % to 80 wt %, from 40 wt % to 90 wt %, or from 50 wt % to 75 wt %.

The aqueous pigment dispersion can be used to formulate the latex ink composition of the present disclosure. In addition to the water, organic co-solvent, copper phthalocyanine pigment, dispersants, other ingredients that may be present in the aqueous pigment dispersion, more of these components or these types of components can be admixed with the aqueous pigment dispersion, along with a latex (which includes by definition additional water and latex particulates, and potentially other ingredients), to form a latex ink composition suitable for jetting from inkjet architecture. In one example, the aqueous pigment dispersion can be formulated in the latex ink composition so that the pigment content can be present at from 0.3 wt % to 7 wt %, from 0.4 wt % to 6 wt %, or from 0.5 wt % to 5 wt % while the pigment to dispersant ratio can be varied from 2 to 10.

Furthermore, the latex ink compositions of the present disclosure can further include latex particles. The latex particles can be present at from 1 wt % to 15 wt %, from 3 wt % to 12 wt %, or from 5 wt % to 10 wt %. In some examples, the latex particles can include a first heteropolymer phase and a second heteropolymer phase. The two phases can be physically separated in the latex particles, such as in a core-shell configuration, a two-hemisphere configuration, smaller spheres of one phase distributed in a larger sphere of the other phase, interlocking strands of the two phases, and so on. The first heteropolymer phase can be polymerized from two or more aliphatic (meth)acrylate ester monomers or two or more aliphatic (meth)acrylamide monomers. The second heteropolymer phase can be polymerized from a cycloaliphatic monomer and an aromatic monomer. The cycloaliphatic monomer can be a cycloaliphatic (meth)acrylate monomer or a cycloaliphatic (meth)acrylamide monomer. The aromatic monomer can be an aromatic (meth)acrylate monomer or an aromatic (meth)acrylamide monomer. The second heteropolymer phase can have a higher $T_g$ than the first heteropolymer phase. The first heteropolymer composition may be considered a soft polymer composition and the second heteropolymers composition may be considered a hard polymer composition In certain examples, the first heteropolymer composition can be present in the latex particles in an amount ranging from about 15 wt % to about 70 wt % of a total weight of the polymer particle and the second heteropolymer composition can be present in an amount ranging from about 30 wt % to about 85 wt % of the total weight of the polymer particle. In other examples, the first heteropolymer composition can be present in an amount ranging from about 30 wt % to about 40 wt % of a total weight of the polymer particle and the second heteropolymer composition can be present in an amount ranging from about 60 wt % to about 70 wt % of the total weight of the polymer particle. In one specific example, the first heteropolymer composition can be present in an amount of about 35 wt % of a total weight of the polymer particle and the second heteropolymer composition can be present in an amount of about 65 wt % of the total weight of the polymer particle.

In certain examples, the first heteropolymer phase can include aliphatic (meth)acrylate ester monomers such as linear aliphatic (meth)acrylate ester monomers and/or cycloaliphatic (meth)acrylate ester monomers. Examples of the linear aliphatic (meth)acrylate ester monomers can include ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

In further examples, the cycloaliphatic monomer of the second heteropolymer phase can be cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, or a combination thereof. In still further examples, the aromatic monomer of the second heteropolymer phase can be 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, or a combination thereof.

In some examples, the latex particles can be prepared by flowing multiple monomer streams into a reactor. An initiator can also be included in the reactor. The initiator may be selected from a persulfate, such as a metal persulfate or an ammonium persulfate. In some examples, the initiator may be selected from a sodium persulfate, ammonium persulfate or potassium persulfate. In further examples, the latex particles can have a particle size ranging from 20 nm to 500 nm, from 50 nm to 350 nm, or from 150 nm to 270 nm.

Thus, in accordance with examples of the present disclosure, a latex ink composition can be prepared to include the ingredients in Table 1 below. These ranges are exemplary only, and thus, can be modified.

TABLE 1

Latex Ink Compositions

| Ingredient | Weight Percent (wt %) |
| --- | --- |
| [1]Copper phthalocyanine pigment | 0.3-7 |
| Organic co-solvent | 5-40 |
| Latex particles | 1-15 |
| Water | Balance |

[1]co-dispersed with styrene-acrylic dispersant and a hydrophilic polyurethane dispersant In addition to the ingredients shown in Table 1, the latex ink compositions can further include other liquid or solid components. For example, in some examples, the ink composition can include wax particles. The wax particles can be from a naturally occurring wax, a synthetic wax, or a combination thereof. Exemplary waxes can include beeswax, lanolin, carnauba, jojoba, paraffin, microcrystalline, micronized, polyethylene, polypropylene, polyamide, poly tetrafluoroethylene, or combinations thereof. In one example, the wax can be polyethylene emulsion. A commercially available example can include Aquaslip™ and Liquilube™ 405 (both available from The Lubrizol Corp., Ohio). In some examples, the wax particles can be filtered. When incorporated, the wax particles can be included in the latex ink composition from about 0.1 wt % to about 3 wt %, from about 0.1 wt % to 2 wt %, or from about 0.5 wt % to 1 wt %.

With specific reference to the aqueous pigment dispersion, the organic co-solvent can include 2-methyl-1,3-propanediol (MPDiol); 2-pyrrolidone (2P), 1,2-propanediol, 1,2-butanediol, ethylene glycol, 2-methyl-2,4-pentanediol, 1,3-butanediol, 1,3-propanediol, 1,4-butanediol, ethylene glycol 2-ethylhexyl ether, dipropylene glycol n-butyl ether, diethylene glycol n-butyl ether, propylene glycol phenyl ether, tripropylene glycol methyl ether, 2,2,4-trimethyl-1,3-pentanediol monoisobutyrate, triethyl citrate, tripropylene glycol n-propyl ether, tripropylene glycol n-butyl ether, tetraethylene glycol dimethyl ether, dipropylene glycol phenyl ether, or combinations thereof. Other organic co-solvents can of course be used in some instances, and furthermore, when formulating the latex ink composition from the aqueous pigment dispersion, a lengthy list of organic co-solvents along with many other types of ingredients, can also be included. For example, the aqueous liquid vehicle can include organic co-solvents compatible with the various components in the latex ink composition, including polar solvents such as alcohols, amides, esters, ketones, lactones, and ethers. In some examples the co-solvent can be an aliphatic alcohol, an aromatic alcohol, diol, glycol ether, polyglycol ether, caprolactam, formamide, acetamide, long chain alcohol, or combinations thereof. Exemplary co-solvents can include 2-methyl-1,3-propanediol (MPDiol); 2-pryollidone (2P); 2-ethyl-2-(hydroxymethyl)-1, 3-propane diol; glycerol; N-methylpyrrolidone; dimethyl sulfoxide; sulfolane; glycol ethers; alkyldiols; 1,2-hexanediol; ethoxylated glycerols; LEG-1 (Liponie® EG-1); or combinations thereof. In one example, the co-solvent in the aqueous liquid vehicle can include 2-methyl-1,3-propanediol; 2-pryollidone; or combinations thereof. The co-solvents can be present in the aqueous liquid vehicle, as mentioned, at from 5 wt % to 40 wt %, from 10 wt % to 35 wt %, from 15 wt % to 30 wt %, from 20 wt % to 30 wt %, or from 10 wt % to 30 wt %.

In some examples, the aqueous liquid vehicle can include surfactant. In one example, the surfactant can include a non-ionic surfactants, fluorosurfactants, phosphate ester surfactants, alkyl polyethylene oxides, alkyl phenyl polyethylene oxides, polyethylene oxide block copolymers, acetylenic polyethylene oxide, polyethylene oxide amines, polyethylene oxide esters, dimethicone copolyols, ethoxylated surfactants, alcohol ethoxylated surfactants, or combinations thereof. Exemplary surfactants can include oleth-3 phosphate (commercially available as Crodafos™ N3 acid from Croda® International Plc, England); secondary alcohol ethoxylates (commercially available as Tergitol® 15-S-7 and Tergitol® TM-6 from Union Carbide Corp., New York); fluorinated polymeric surfactant (commercially available as Capstone™ FS-35 available from DuPont™ Chemicals and Fluoroproducts, Delaware); or combinations thereof. If present, the surfactant can be included in the aqueous liquid vehicle from 0.1 wt % to 5 wt %, from 1 wt % to 3 wt %, or from 0.5 wt % to 2.5 wt %.

In yet other examples the aqueous liquid vehicle can include various other additives. Examples of these additives can include additives to inhibit the growth of harmful microorganisms, sequestering agents, viscosity modifiers, and the like. Exemplary additives that can be used to inhibit the growth of harmful microorganisms can include biocides, fungicides, microbial agents, and the like. Commercially available microbial agents can include Acticide® (Thor Specialties, Inc., Connecticut), Nuosept™ (Ashland™ Global Holdings Inc., North America), Ucarcide™ (Union carbide Corp., New Jersey), Vancide® (R.T. Vanderbilt Holding Co., Connecticut), Proxel™ (Imperial Chemical Industries, Inc., New Jersey), or combinations thereof. Sequestering agents, such as EDTA (ethylene diamine tetra acetic acid), can be included to eliminate the deleterious effects of multi-valent metal impurities and buffer solutions can be used to control the pH of the ink. Viscosity modifiers and buffers can also be present, as well as other additives to modify properties of the latex ink compositions as desired.

The latex ink compositions presented herein can exhibit good stability when stored as a bulk dispersion. These latex ink compositions do not exhibit significant changes in viscosity following exposure to even multiple freeze-thaw cycles (a single freeze-thaw cycle includes freezing the latex ink composition to $-40\,°$ C. and then heating to $70\,°$ C.), and furthermore, they do not tend to exhibit significant changes in viscosity following accelerated shelf-life testing. In addition, the latex ink compositions described herein can exhibit good decal performance, even after Accelerated Shelf Life (ASL) test. Decel refers to the decrease of drop velocity over time during continuous firing of the pen. No decel is preferred, or in other words, the preferred decrease of drop velocity is 0. Acceptable decel performance for the inks can be characterized by the decrease of drop velocity less than 1 m/s. Without being limited by theory, it is believed that these features can be attributed to the co-dispersion of the copper phthalocyanine pigments by the styrene-acrylic dispersant and the hydrophilic polyurethane dispersant.

In further detail, the present disclosure is also drawn to a method for formulating a latex ink composition, as shown in FIG. 2. The method 200 can include admixing 202 an aqueous latex dispersion and an aqueous pigment dispersion in a liquid vehicle to form the latex ink composition. The aqueous pigment dispersion can be a copper phthalocyanine pigment co-dispersed by a styrene-acrylic dispersant and a hydrophilic polyurethane dispersant. The hydrophilic polyurethane dispersant can have a weight average molecular weight from 10,000 Mw to 30,000 Mw. The latex ink composition can include from 0.3 wt % to 7 wt % of the copper phthalocyanine pigment and from 1 wt % to 15 wt % latex particles. The individual components of the latex ink composition can be as described herein.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

"Decel" is short for deceleration and refers to a decrease of drop velocity in the unit meters per second (m/s) over time during continuous firing of a print head.

"Volume-weighted mean diameter" is the mean diameter of a co-dispersed copper phthalocyanine pigment particles within a specific volume.

The term "acid value or acid number" refers to the minimum mass of potassium hydroxide (KOH) in milligrams that can be used to neutralize one gram of substance, such as the various dispersants disclosed herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the technology has been described above with particularity, the following provide further detail in connection with what are presently deemed to be the acceptable examples.

Example 1—Preparation of Hydrophilic Polyurethane Dispersant

A polyurethane dispersant was prepared from isophorone diisocyanate (IPDI), Bisphenol A ethoxylate (BPAE), 2,2'-dimethylol propionic acid (DMPA), and Ymer™ N120 (Perstop), using the relative weight percentages shown below in Table 2, as follows:

TABLE 2

| Hydrophilic Polyurethane Dispersant | |
|---|---|
| Ingredient | Wt % |
| Isophorone diisocyanate (IPDI) | 51.90 |
| Polycarbonate polyol Mw 1000 (Kuraray ® C-1090)* | 23.16 |
| 2,2'-dimethylol propionic acid (DMPA) | 23.99 |
| Ymer ™ N120 (Perstop) | 0.94 |

The polyurethane dispersant had a weight average molecular weight of 15,000 Mw.

Example 2—Aqueous Pigment Dispersions

Several different pigment dispersions were formulated for incorporation in various latex ink compositions. The aqueous pigment dispersions included 15 wt % Pigment Blue 15:3, 15 wt % of 2-pyrrolidone, and amounts of Joncryl® 671 (a styrene-acrylic dispersant) and the polyurethane dispersion of Example 1 as shown in Table 3 below. The balance of each dispersion is water.

TABLE 3

| Formulation ID and Pigment Dispersion* | | |
|---|---|---|
| Dispersion ID | Joncryl ® 671 Dispersant (wt %) | PU Dispersant (Example 1) (wt %) |
| Comparative Dispersion | 4.5 | — |
| Dispersion 1 | 3 | 1.5 |
| Dispersion 2 | 2.25 | 2.25 |
| Dispersion 3 | 1.5 | 3 |

Example 3—Latex Dispersion

Latex particles were formed with two different streams of monomers. One monomer stream included a solution of soft component monomers (i.e., monomers suitable for forming the first heteropolymer composition disclosed herein), and the other monomer stream included an emulsion of several hard and/or hydrophobic component monomers and an additional monomer (i.e., monomers suitable for forming the second heteropolymer composition disclosed herein).

The latex particles were prepared as follows. Deionized water (58.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including methyl methacrylate (12.1 g), butyl acrylate (22.4 g), and methacrylic acid (0.54 g); (B) a solution of copolymerizable surfactant (HITENOL® AR-1025) (1.75 g) dissolved in water (5.0 g); and (C) a solution of potassium persulfate (0.2 g) dissolved in water (10.0 g). Streams (A) and (B) were added over 105 minutes. Stream (C) was initiated with streams (A) and (B), but with a targeted feed time of 360 minutes. When streams (A) and (B) were completed, the reaction was held at 77° C. for one hour (stream (C) continued to feed during this time). After the one hour period, a new feed (D) was fed over 195 minutes. Feed (D) included an aqueous emulsion of water (30 g), copolymerizable surfactant (HITENOL® AR-1025) (7.0 g), cyclohexyl methacrylate (45.1 g), cyclohexyl acrylate (6.5 g), phenoxyethyl methacrylate (9.1 g), and methacrylic acid (2.6 g).

Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added.

The resulting polymer particles included a two heteropolymer phases—one of methyl methacrylate, butyl acrylate, and methacrylic acid and the other of cyclohexyl methacrylate, cyclohexyl acrylate, phenoxyethyl methacrylate, and methacrylic acid. The example polymer particles were present in an emulsion (i.e., a latex emulsion), and made up 42.4% solids by total weight of the latex emulsion. The particle size of the example polymer particles was 0.215 μm (particle size determined using Microtrac Nanotrac Wave II), and the viscosity (at 25° C.) of the latex emulsion was less than 50 cps.

Example 4—Latex Ink Compositions

The pigment dispersions of Example 2 (Table 3) were then admixed with other ingredients to form latex ink compositions to test ink stability and decel performance. The ingredients in the latex ink compositions are shown in Table 4 below.

TABLE 4

Latex Ink Composition

| Ingredient | Type | Wt % |
|---|---|---|
| 2-pyrrolidinone (2P) | Organic Co-solvent | 3 |
| 1,2-butanediol | Organic Co-solvent | 18 |
| Crodafos ™ OA3 | Surfactant | 0.35 |
| Tergitol ® 15-S-7 | Surfactant | 0.2 |
| Dowanol ™TPM | Surfactant | 2 |
| Capstone ™ FS-35 | Surfactant | 0.4 |
| Latex of Example 3 | Latex Particles | 10 |
| Copper phthalocyanine pigment* | Pigment | 2 |
| Deionized water | Solvent | balance |

*The copper phthalocyanine pigment was added by including a sufficient amount of each of the aqueous pigment dispersions of Example 2 to provide 2 wt % pigment.
Crodafos ™ is available from Croda ® International Pic.
Tergitol ® is available from Union Carbide Corp.
Capstone ™ is available from DuPont ™ Chemicals and Fluoroproducts.
Dowanol ™is available from Dow Chemical.

Example 5—Viscosity, Freeze-Thaw Viscosity, Accelerated Shelf Life (ASL), Particle Size Distribution, and D95 Particle Size The initial viscosity, viscosities after freeze-thaw and accelerated shelf-life (ASL) testing were measured on a Viscolite viscometer. Samples were equilibrated to 25±1° C. in a water batch before the measurements.

The samples were also tested with respect to particle size including volume averaged particle size (Mv) and particle size at which 95% of the particles are smaller and only 5% are larger (D95), both before and after freeze-thaw cycling and accelerated shelf-life testing, using a NanoTra® 150 particle size system.

To test freeze-thaw viscosity related changes, 5 freeze-thaw cycles were performed on each of the samples (30 mL samples were tested). During an individual freeze-thaw cycle, a sample was placed in an oven with the temperature ramped from initial temperature to 70° C. in 20 min, and maintained at 70° C. for 4 hours, decreased from 70° C. to −40° C. in 20 min and maintained at −40° C. for 4 hr. This process was repeated, such that each sample was subjected to a total of 5 freeze-thaw cycles. Following the fifth cycle, each of the samples was allowed to equilibrate to room temperature, and the viscosity and particle size were tested.

In order to determine the accelerated shelf-life (ASL), a 30 mL sample of each of the formulations were stored in an oven set to 60° C. for 7 days. Following the storage period, each of the samples was allowed to equilibrate to room temperature, and the viscosity and particle size were tested.

The stability of the pigment dispersions of Example 2 were tested first, and then the stability of the inks of Example 4 were tested. Tables 5A and 5B show the results of testing the pigment dispersions for volume averaged particle size and d95 particle size after freeze-thaw cycles and accelerated shelf life aging. In Tables 5A and 5B, T-cycle=5 Freeze-Thaw Cycles from −40° C. to 70° C.; ASL=Accelerated Shelf Life (ASL) at 60° C.; Mv=Volume Averaged Particle Size; and D95=95 Percentile Particle Size.

TABLE 5A

Particle Size (Mv – μm)

| Dispersion ID | Initial | T-cycle | % Δ T-cycle | 1 Week ASL | % Δ 1 Week ASL |
|---|---|---|---|---|---|
| Comparative | 0.120 | 0.114 | −5.1 | 0.124 | 3.6 |
| Dispersion 1 | 0.117 | 0.111 | −5.1 | 0.112 | −4.2 |
| Dispersion 2 | 0.123 | 0.118 | −4.1 | 0.124 | 0.8 |
| Dispersion 3 | 0.125 | 0.113 | −9.6 | 0.128 | 2.4 |

TABLE 5B

Particle Size (d95 – μm)

| Dispersion ID | Initial | T-cycle | % Δ T-cycle | 1 Week ASL | % Δ 1 Week ASL |
|---|---|---|---|---|---|
| Comparative | 0.199 | 0.215 | 8.1 | 0.226 | 13.6 |
| Dispersion 1 | 0.202 | 0.197 | −2.6 | 0.199 | −1.6 |
| Dispersion 2 | 0.234 | 0.195 | −16.7 | 0.227 | −3.0 |
| Dispersion 3 | 0.230 | 0.206 | −10.4 | 0.210 | −8.7 |

The inks were tested for freeze-thaw related changes and accelerated shelf life changes in viscosity and particle size including Mv and D95. The results are shown in Tables 6A-6C. The Comparative Ink was prepared from the Comparative Dispersion of Example 2. Inks 1-3 were prepared with Dispersions 1-3 from Example 2, respectively. In Tables 5A-5C below, V=Viscosity; T-cycle=5 Freeze-Thaw Cycles from −40° C. to 70° C.; ASL=Accelerated Shelf Life (ASL) at 60° C. for 1 week; Mv=Volume Averaged Particle Size; and D95=95 Percentile Particle Size.

TABLE 6A

Viscosity (V – cP)

| Ink ID | Initial | 1 Week ASL | % Δ 1 Week ASL | 2 Week ASL | % Δ 2 Week ASL |
|---|---|---|---|---|---|
| Comparative | 3.9 | 3.8 | −2.6 | 4.0 | 2.6 |
| Ink 1 | 3.9 | 3.9 | 0.0 | 3.9 | 0.0 |
| Ink 2 | 4.0 | 3.9 | −2.5 | 3.9 | −2.5 |
| Ink 3 | 4.0 | 3.9 | −2.5 | 3.9 | −2.5 |

TABLE 6B

Particle Size (Mv – μm)

| Ink ID | Initial | T-cycle | % Δ T-cycle | 1 Week ASL | % Δ 1 Week ASL | 2 Week ASL | % Δ 2 Week ASL |
|---|---|---|---|---|---|---|---|
| Comparative | 0.173 | 0.170 | −1.3 | 0.169 | −2.2 | 0.159 | −7.7 |
| Ink 1 | 0.173 | 0.178 | 2.9 | 0.173 | 0.2 | 0.163 | −6.4 |

TABLE 6B-continued

Particle Size (Mv – μm)

| Ink ID | Initial | T-cycle | % Δ T-cycle | 1 Week ASL | % Δ 1 Week ASL | 2 Week ASL | % Δ 2 Week ASL |
|---|---|---|---|---|---|---|---|
| Ink 2 | 0.173 | 0.175 | 1.2 | 0.170 | −1.9 | 0.172 | −0.3 |
| Ink 3 | 0.170 | 0.174 | 1.9 | 0.167 | −2.0 | 0.168 | −1.6 |

TABLE 6B

Particle Size (d95 – μm)

| Ink ID | Initial | T-cycle | % Δ T-cycle | 1 Week ASL | % Δ 1 Week ASL | 2 Week ASL | % Δ 2 Week ASL |
|---|---|---|---|---|---|---|---|
| Comparative | 0.299 | 0.311 | 4.1 | 0.238 | −20.2 | 0.229 | −23.2 |
| Ink 1 | 0.291 | 0.317 | 9.0 | 0.294 | 1.3 | 0.236 | −19.0 |
| Ink 2 | 0.289 | 0.306 | 5.8 | 0.300 | 3.7 | 0.275 | −4.8 |
| Ink 3 | 0.277 | 0.304 | 9.9 | 0.281 | 1.4 | 0.286 | 3.4 |

As can be seen in Tables 5A-6C above, the freeze-thaw and accelerated shelf life related changes in viscosity and particle size were generally good for all of the inks.

Example 6—Decel Performance

The ink compositions of Example 4 were also tested for decel performance. In order to determine decel performance, each of the formulations were filled into a thermal inkjet print head and the drop velocity vs. firing time over 6 seconds was collected. The inks were tested as initially prepared and also after aging for 2 weeks ASL. The loss in velocity is also shown in Table 7 below.

TABLE 7

Decel Performance

| Ink ID | Aging | Decel |
|---|---|---|
| Comparative | Initial | 0 |
| Ink 1 | Initial | 0 |
| Ink 2 | Initial | 0 |
| Ink 3 | Initial | 0 |
| Comparative | 2 Week ASL | 1.6 |
| Ink 1 | 2 Week ASL | 0.7 |
| Ink 2 | 2 Week ASL | 0.3 |
| Ink 3 | 2 Week ASL | 0.3 |

As can be seen in Table 7, the comparative ink showed the greatest amount of decel after 2 weeks ASL. The comparative ink did not contain the hydrophilic polyurethane dispersant. In contrast, Inks 1-3 had better decel performance. In ink 1, the ratio of the styrene-acrylic dispersant to the polyurethane dispersant was 2:1. In ink 2, the ratio was 1:1 and in ink 3, the ratio was 1:2. The decel results suggest that increasing the amount of hydrophilic polyurethane dispersant relative to the styrene-acrylic dispersant tends to improve the decel performance. Inks 2 and 3 had the best decel performance.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A latex ink composition, comprising:
an aqueous liquid vehicle;
from 0.3 wt % to 7 wt % of a copper phthalocyanine pigment, wherein the copper phthalocyanine pigment is co-dispersed by a styrene-acrylic dispersant and a hydrophilic polyurethane dispersant having a weight average molecular weight from 10,000 Mw to 30,000 Mw, the hydrophilic polyurethane dispersant being a copolymerization product of monomers including an aromatic diol, an acid-containing diol, and a non-aromatic diisocyanate, wherein the aromatic diol is

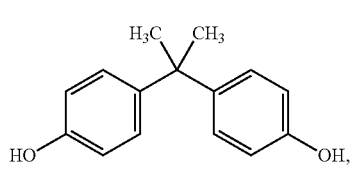

(I)

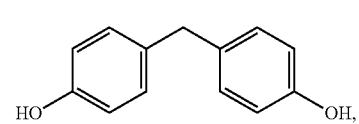

(II)

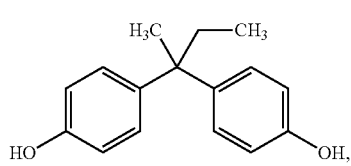

(III)

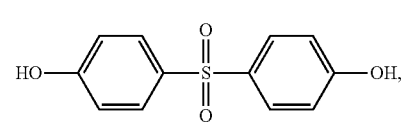

(IV)

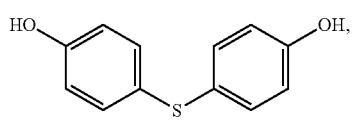
(V)

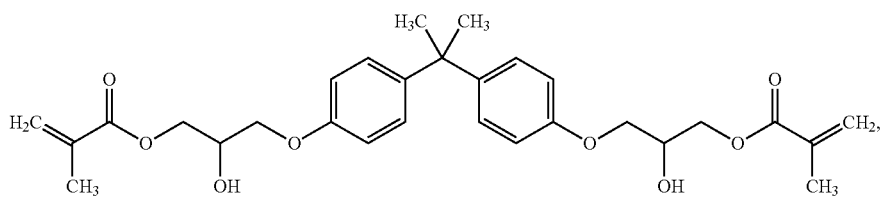
(VI)

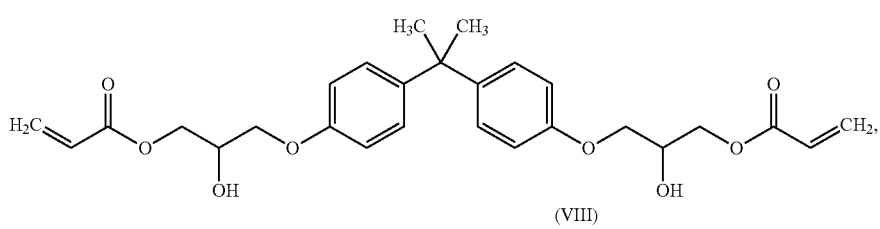
(VII)

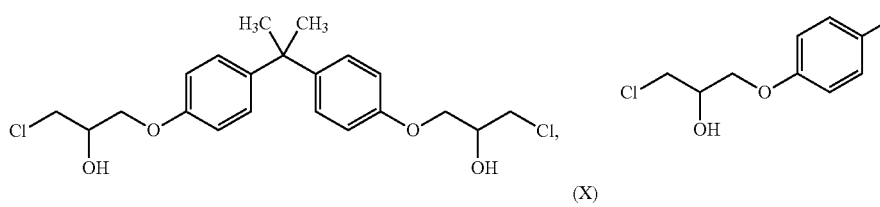
(VIII)

(IX)

(X)

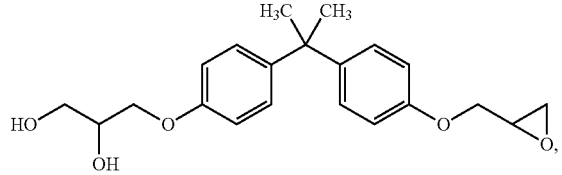
(XI)

or a combination thereof, wherein m and n are independently integers from 1 to 10; and from 1 wt % to 15 wt % of latex particles.

2. The latex ink composition of claim 1, wherein the styrene-acrylic dispersant and the hydrophilic polyurethane dispersant are present at a weight ratio from 1:10 to 2:1.

3. The latex ink composition of claim 1, wherein the monomers of the hydrophilic polyurethane dispersant are copolymerized in amounts of from 10 wt % to 50 wt % of the aromatic diol, from 10 wt % to 40 wt % of the acid-containing diol, and from 25 wt % to 75 wt % of the non-aromatic diisocyanate.

4. The latex ink composition of claim 1, wherein the copper phthalocyanine pigment and total dispersant content are present at a weight ratio from 15:1 to 2:1.

5. The latex ink composition of claim 1, wherein the styrene-acrylic dispersant has a weight average molecular weight ranging from 4,000 Mw to 30,000 Mw and an acid number ranging from 100 mg/g to 350 mg/g, and wherein the hydrophilic polyurethane dispersant has an acid number ranging from 40 mg/g to mg/g 100.

6. The latex ink composition of claim 1, wherein the hydrophilic polyurethane dispersant has an average particle size ranging from 0.1 nm to 30 nm.

7. The latex ink composition of claim 1, wherein the latex particles comprise a polymerization product of:

a copolymerizable surfactant;
an aromatic monomer selected from styrene, an aromatic (meth)acrylate monomer, and an aromatic (meth)acrylamide monomer; and
multiple aliphatic (meth)acrylate monomers or multiple aliphatic (meth)acrylamide monomers.

8. A latex ink composition, comprising:
an aqueous liquid vehicle;
from 0.3 wt % to 7 wt % of a copper phthalocyanine pigment, wherein the copper phthalocyanine pigment is co-dispersed by a styrene-acrylic dispersant and a hydrophilic polyurethane dispersant having a weight average molecular weight from 10,000 Mw to 30,000 Mw, the hydrophilic polyurethane dispersant being a copolymerization product of monomers including an aromatic diol, an acid-containing diol, and a non-aromatic diisocyanate, wherein the non-aromatic diisocyanate is

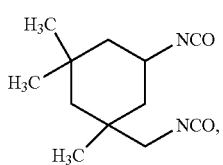
(XII)

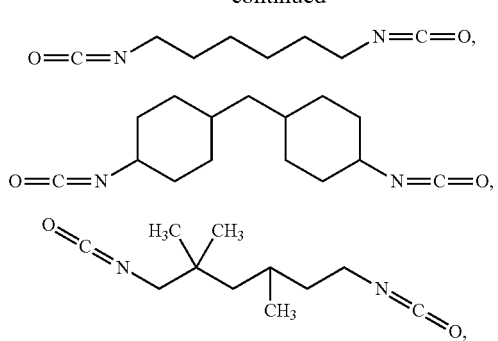

or a combination thereof; and from 1 wt % to 15 wt % of latex particles.

9. The latex ink composition of claim 8, wherein the styrene-acrylic dispersant and the hydrophilic polyurethane dispersant are present at a weight ratio from 1:10 to 2:1.

10. The latex ink composition of claim 8, wherein the monomers of the hydrophilic polyurethane dispersant are copolymerized in amounts of from 10 wt % to 50 wt % of the aromatic diol, from 10 wt % to 40 wt % of the acid-containing diol, and from 25 wt % to 75 wt % of the non-aromatic diisocyanate.

11. The latex ink composition of claim 8, wherein the copper phthalocyanine pigment and total dispersant content are present at a weight ratio from 15:1 to 2:1.

12. The latex ink composition of claim 8, wherein the styrene-acrylic dispersant has a weight average molecular weight ranging from 4,000 Mw to 30,000 Mw and an acid number ranging from 100 mg/g to 350 mg/g, and wherein the hydrophilic polyurethane dispersant has an acid number ranging from 40 mg/g to mg/g 100.

13. The latex ink composition of claim 8, wherein the hydrophilic polyurethane dispersant has an average particle size ranging from 0.1 nm to 30 nm.

14. The latex ink composition of claim 8, wherein the latex particles comprise a polymerization product of:

a copolymerizable surfactant;

an aromatic monomer selected from styrene, an aromatic (meth)acrylate monomer, and an aromatic (meth)acrylamide monomer; and multiple aliphatic (meth)acrylate monomers or multiple aliphatic (meth)acrylamide monomers.

15. A method of formulating a latex ink composition, comprising admixing an aqueous latex dispersion and an aqueous pigment dispersion including a copper phthalocyanine pigment co-dispersed by a styrene-acrylic dispersant and a hydrophilic polyurethane dispersant having a weight average molecular weight from 10,000 Mw to 30,000 Mw in an aqueous liquid vehicle, the hydrophilic polyurethane dispersant being a copolymerization product of monomers including an aromatic diol, an acid-containing diol, and a non-aromatic diisocyanate, and wherein the aromatic diol is

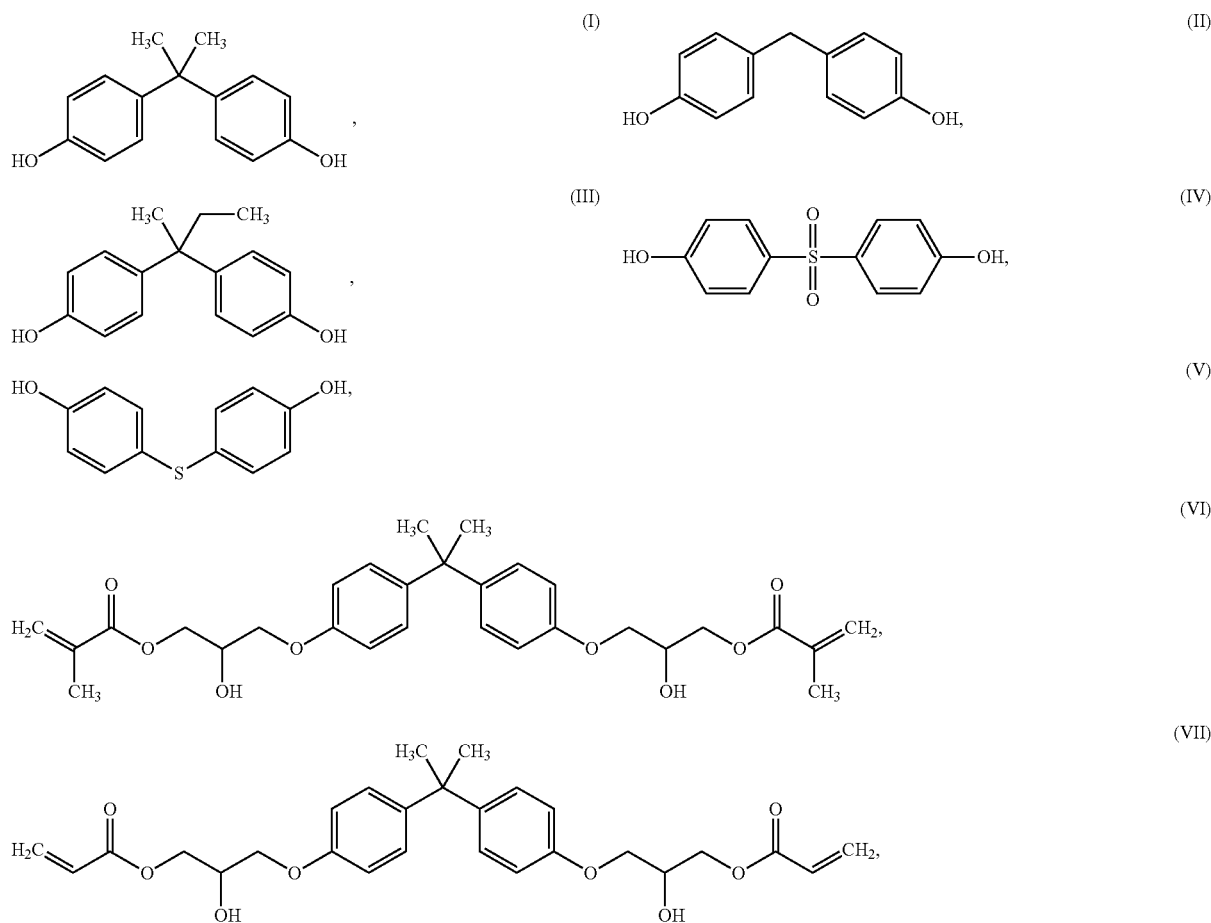

-continued

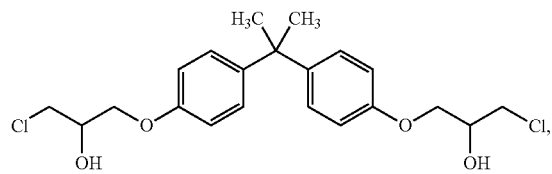
(VIII)

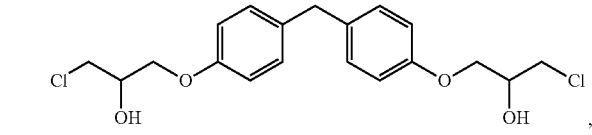
(IX)

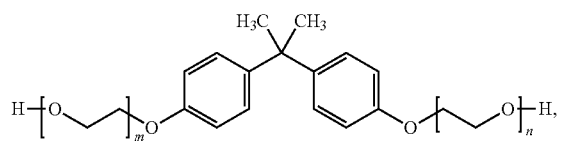
(X)

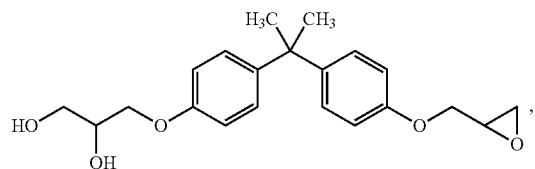
(XI)

or a combination thereof, wherein m and n are independently integers from 1 to 10, and
wherein the latex ink composition includes from 0.3 wt % to 7 wt % of the copper phthalocyanine pigment and from 1 wt % to 15 wt % of latex particles.

16. The method of claim 15, wherein the monomers of the hydrophilic polyurethane dispersant are copolymerized in amounts of from 10 wt % to 50 wt % of the aromatic diol, from 10 wt % to 40 wt % of the acid-containing diol, and from 25 wt % to 75 wt % of the non-aromatic diisocyanate.

17. A method of formulating a latex ink composition, comprising admixing an aqueous latex dispersion and an aqueous pigment dispersion including a copper phthalocyanine pigment co-dispersed by a styrene-acrylic dispersant and a hydrophilic polyurethane dispersant having a weight average molecular weight from 10,000 Mw to 30,000 Mw in an aqueous liquid vehicle, the hydrophilic polyurethane dispersant being a copolymerization product of monomers including an aromatic diol, an acid-containing diol, and a non-aromatic diisocyanate, and wherein the non-aromatic diisocyanate is

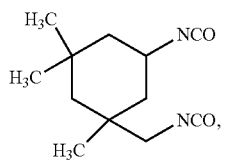
(XII)

(XIII)

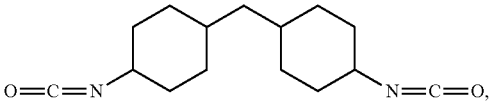
(XIV)

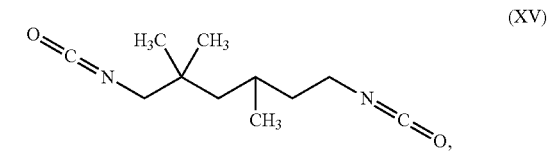
(XV)

or a combination thereof, and
wherein the latex ink composition includes from 0.3 wt % to 7 wt % of the copper phthalocyanine pigment and from 1 wt % to 15 wt % of latex particles.

18. The method of claim 17, wherein the monomers of the hydrophilic polyurethane dispersant are copolymerized in amounts of from 10 wt % to 50 wt % of the aromatic diol, from 10 wt % to 40 wt % of the acid-containing diol, and from 25 wt % to 75 wt % of the non-aromatic diisocyanate.

* * * * *